US008678281B2

(12) United States Patent
Kangas et al.

(10) Patent No.: US 8,678,281 B2
(45) Date of Patent: Mar. 25, 2014

(54) RFID SCANNING SYSTEM AND SHOPPING BAG WITH INTEGRATED RFID LOOP ANTENNA

(75) Inventors: P. Daniel Kangas, Raleigh, NC (US); Jeff D. Thomas, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 148 days.

(21) Appl. No.: 13/302,422

(22) Filed: Nov. 22, 2011

(65) Prior Publication Data

US 2013/0126611 A1   May 23, 2013

(51) Int. Cl.
    *G06F 19/00* (2011.01)
(52) U.S. Cl.
    USPC ........................................... 235/385; 235/380
(58) Field of Classification Search
    USPC ............................. 235/385, 380, 383, 462.46
    See application file for complete search history.

(56) References Cited

U.S. PATENT DOCUMENTS

| | | | |
|---|---|---|---|
| 6,222,452 B1 | 4/2001 | Ahlstrom et al. | |
| 6,624,752 B2 | 9/2003 | Klitsgaard et al. | |
| 6,696,954 B2 | 2/2004 | Chung | |
| 7,446,663 B2 | 11/2008 | Rowe, Jr. | |
| 7,477,149 B2 | 1/2009 | Kangas | |
| 7,776,601 B2 | 8/2010 | DeGaulle et al. | |
| 7,852,221 B2 | 12/2010 | Tuttle | |
| 7,898,414 B2 | 3/2011 | Spano | |
| 7,901,533 B2 | 3/2011 | Steidinger | |
| 7,902,984 B2 | 3/2011 | Duron et al. | |
| 7,944,401 B2 | 5/2011 | Gakhar et al. | |
| 2006/0208894 A1* | 9/2006 | Friend et al. | 340/572.3 |
| 2007/0228678 A1 | 10/2007 | Solomon et al. | |
| 2008/0055083 A1 | 3/2008 | Yu | |
| 2009/0140850 A1 | 6/2009 | Kangas et al. | |
| 2010/0265068 A1 | 10/2010 | Brackmann et al. | |
| 2011/0089234 A1* | 4/2011 | Iida | 235/383 |
| 2011/0133947 A1* | 6/2011 | Kraguljac | 340/686.6 |

OTHER PUBLICATIONS

"Flexible Circuit Loop Antenna", www.taoglas.com, Flexible Circuit Loop Antenna | Medical Electronics Design, http://www.medicalelectronicsdesign.com/products/flexible-circuit-loop-antenna, Mar. 18, 2010, 1 page.

Sharma, "Taoglas Launches First Flexible Circuit Loop Antennas for Healthcare M2M Market", Taoglas, http://m2m.tmcnet.com/topics/m2mevolution/articles/72057-taoglas-launches-first-flexible-circuit-loop-antennas-healthcare.htm, Jan. 6, 2010, 2 pages.

* cited by examiner

*Primary Examiner* — Daniel St Cyr
(74) *Attorney, Agent, or Firm* — Katherine S. Brown; Jeffrey L. Streets (57) ABSTRACT

A point of sale system and method are disclosed wherein a shopping bag has one or more RFID loop type antenna. An example system includes a bag holder for securing the shopping bag while items are placed in it. Multiple bag holders may be incorporated on a carousel, which can be rotated to move an empty bag to a filling station at the checkout counter, and to move filled bags to an open area for the customer or cashier to retrieve the filled shopping bags. An RFID reader in communication with the bag holder uses one of the RFID loop antennas to read the RFID tags on the items placed in the bag. In a shopping bag having more than one RFID loop antenna, the RFID system controller may monitor the impedance of each RFID loop antenna and dynamically select one of the RFID loop antennas on the shopping bag as a function of the impedances.

20 Claims, 8 Drawing Sheets

RFID SCANNING SYSTEM AND SHOPPING BAG WITH INTEGRATED RFID LOOP ANTENNA

BACKGROUND

1. Field of the Invention

The present invention relates generally to retail point of sale systems, and more particularly to RFID scanning of retail goods.

2. Background of the Related Art

Point of sale (POS) systems are specialized computer systems used in retail environments for facilitating the checkout process, and which identify and account for items that a customer has selected for purchase. Modern POS systems typically include a POS terminal located at a checkout counter to facilitate the checkout process. A POS terminal typically includes a variety of user interface devices, such as a cash register, check/debit card/credit card reader, and a bar code scanner. The Universal Product Code (UPC) scheme is commonly used to uniquely identify items selected for purchase. The UPC scheme uses barcode symbology that has improved the speed and accuracy of checkout. The UPC scheme allows each item selected for purchase to be scanned in with an optical scanner, one item at a time, and cross-referenced with an electronic database containing price information for the associated item.

Various item-tracking solutions using radio frequency identification (RFID) tags have been proposed in an effort to provide even greater speed and accuracy than conventional UPC systems. RFID-based scanning systems typically involve an active scanning device, and a transponder in the form of an active, passive, or semi-passive RFID tag affixed to each item. RFID tags can be read from up to several meters away, and RFID scanners are capable of multi-directional reading, allowing RFID tracking systems to scan for multiple items in the vicinity of the scanner. Efforts to implement RFID-based scanning systems have included proposed ideas for scanning an entire shopping cart full of items at once in an effort to save time over individually scanning item barcodes. However, difficulties have arisen in obtaining an accurate accounting of shopping cart contents when scanning the entire shopping cart. For example, items near the center of a cart may not be reliably detected with an RFID scanner using existing technology.

BRIEF SUMMARY

An inventory tracking system and method are disclosed for facilitating the checkout of items with RFID tags. A disclosed example system describes a shopping bag having at least one RFID loop antenna along a perimeter of the shopping bag. The RFID loop antenna may make one or more passes along the perimeter. A bag holder secures the shopping bag with a shopping bag interface electrically connected with the at least one RFID loop antenna. A controller includes an RFID reader electrically connected with the shopping bag interface and configured to read RFID tags on items in the shopping bag using the at least one RFID loop antenna on the shopping bag. A plurality of the described bag holders may be provided on a carousel that allows for positioning a selected bag holder and shopping bag at a filling station adjacent a checkout counter. A disposable version of the shopping bag may have antenna loops formed from electrically conductive ink silk-screened onto the bag. In a shopping bag having multiple RFID loop antennas, the controller may sense the impedance of each antenna and dynamically select from among the available antennas according to the sensed impedances.

DETAILED DESCRIPTION

A point of sale system and method are disclosed wherein one or more RFID loop antenna is incorporated directly on a shopping bag, so that the contents of each shopping bag may be reliably scanned during checkout. Different examples of shopping bags are disclosed having various RFID loop antenna designs and various numbers of RFID loop antennas. An example system includes a bag holder for holding the shopping bag while items are placed in it. Multiple bag holders may be incorporated on a carousel, which can be rotated to move an empty bag to a filling station at the checkout counter, and to move filled bags to an open area for the customer or cashier to retrieve the filled shopping bags. The bag holder electrically interfaces with the one or more RFID loop antenna on the shopping bag. An RFID reader in communication with the bag holder uses one of the RFID loop antennas to read the RFID tags on the items placed in the bag. In a shopping bag having more than one RFID loop antenna, the RFID system controller may monitor the impedance of each RFID loop antenna and dynamically select one of the RFID loop antennas on the shopping bag as a function of the impedances. The proposed systems and methods reliably scan items selected for purchase, because the items may be scanned individually or in smaller quantities as they are placed in the shopping bag. While the system and method are discussed in the context of a grocery checkout, the disclosed concepts may be applied in any of a variety of retail environments.

Figure 1:
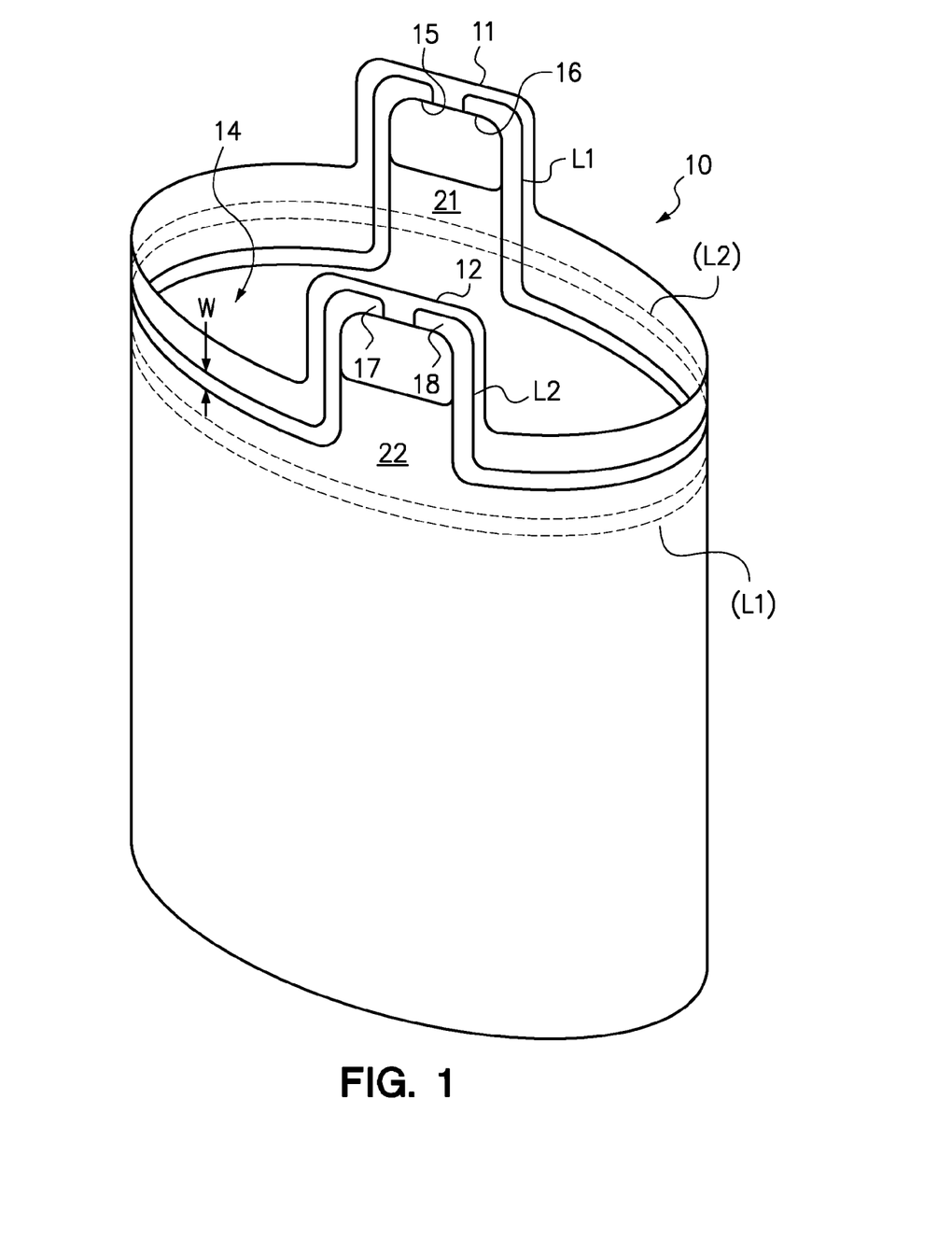
FIG. 1 is a perspective view of a shopping bag having two RFID loop antennas for use with an embodiment of an RFID-based inventory tracking system.

FIG. 1 is a perspective view of a shopping bag 10 for use with an embodiment of an RFID-based inventory tracking system disclosed herein. The shopping bag 10 is provided for conveniently carrying items selected for purchase, such as groceries or retail products that fit into the shopping bag 10. The shopping bag 10 includes an opening 14 for receiving the items and subsequently removing the items from the shopping bag 10. A pair of opposing handles 11, 12 allow a user (e.g. a customer or cashier) to carry the shopping bag 10 and its contents by hand. When carrying the shopping bag 10, the user may bring the opposing handles 11, 12 together and place a hand through the handles 11, 12, which helps secure the contents of the shopping bag 10 and allows the weight of the shopping bag 10 and its contents to be supported from both handles 11, 12. The shopping bag 10 may be optimized as a single-use, "disposable" shopping bag using a lightweight, inexpensive material, such as a thin-walled plastic like polyethylene. A disposable version of the shopping bag 10 may be optimized to have enough strength and durability for a typical shopping trip, but with sufficiently low material-content to minimize the associated cost and environmental impact. Alternatively, a multiple-use version of the shopping bag may be optimized to have the strength and durability to be re-used for multiple shopping trips.

Though a shopping bag according to the disclosed principles may have any number of RFID loop antennas, a suitable shopping bag may have as few as one RFID loop antenna. In this embodiment, two RFID loop antennas L1, L2 are formed on the shopping bag 10 for redundancy and to allow antenna selection based on impedance. The first RFID loop antenna L1 is formed on an interior surface 21 of the shopping bag 10. The second RFID loop antenna L2 is formed on an exterior surface 22 of the shopping bag 10 to avoid crossing the first RFID loop antenna L1. Alternatively, an electrically insulating material may be applied so that both loops may be formed on the same surface (inner or outer) and cross in one or more locations without electrically contacting one another. For example, a first antenna can be formed on the bag 10, and an insulating layer applied in locations where a second antenna is to cross the first antenna, before forming the second antenna on the bag 10. Any number of RFID loop antennas may be constructed in a similar manner.

Referring again to the FIG. 2 embodiment, each RFID loop antenna L1, L2 is oriented along a perimeter of the shopping bag, so that the path of each RFID loop antenna L1, L2 lies in a plane parallel or nearly parallel to a plane of the opening 14 of the shopping bag 10. The term "loop" refers, in part, to the physical resemblance to a loop, even though a loop antenna may be slightly less than 360 degrees. The term "loop" may also refer to the fact that the loop antennas L1, L2 form a complete circuit loop when interfaced with a bag reader, as disclosed below. This orientation of the antennas L1, L2 near the opening 14 helps ensure that items placed in the shopping bag 10 pass through a field of the RFID loop antennas L1, L2. Each loop L1, L2 extends along nearly the full perimeter (360 degrees) of the shopping bag 10. In an alternative embodiment, each RFID loop antenna L1, L2 may extend beyond 360 degrees, optionally making multiple passes around the perimeter of the shopping bag 10, such as along a spiral or corkscrew type path. The RFID loop antennas L1, L2 terminate at the handles 11, 12. Ends 15, 16 of the first loop L1 define a pair of spaced-apart electrical contacts on the first handle 11, and ends 17, 18 of the second loop L2 define another pair of spaced-apart electrical contacts on the second handle 12. These spaced-apart electrical contacts defined by the ends 15, 16 and 17, 18 of the RFID loop antennas L1, L2 will be used to interface with an external RFID reader, as discussed below.

Each RFID loop antenna L1, L2 may be secured to the respective surface 21, 22 of the shopping bag 10 in any of a variety of ways. In one embodiment, the electrically conductive materials used in the antennas L1, L2 may be separately formed, such as from a thin metallic wire or sheet, and subsequently affixed to the shopping bag 10. However, a preferred way to form the antennas, particularly in a disposable version of the shopping bag 10, is to print the antennas L1, L2 on the shopping bag 10 using an electrically conductive ink. Various ink deposition technologies may be applied to form the RFID loop antennas L1, L2, such as silver ink or copper ink printing. It may also be possible to use an electronically conductive polymer or polymer composite. The antennas L1, L2 may be formed, for example, by silk-screening the RFID loop antennas L1, L2 onto a flat sheet of shopping bag material, and cutting a flat pattern from the shopping bag material and joining the flat pattern at the ends. Alternative antenna paths might be used when printing the antennas on a flat pattern so that the antennas L1, L2 are not severed. The RFID loop antennas can be formed by silk-screening on an already-formed (three-dimensional) shopping bag. Alternatively, any silk-screening be performed on a flat sheet material before forming the shopping bag. The "flat pattern" for such a bag may have a pre-printed antenna and the bag may then be joined at the edges to ensure no breaks in electrical conductivity.

The dimensions of the RFID loop antennas L1, L2 may be selected according to a particular application. For most applications, a line width "w" of between 1 to 2 mm is suitable. A line width of greater than 2 mm is generally unnecessary because the read range between an antenna on the perimeter of the shopping bag and the RFID tag passing through the RFID loop antenna is small. The thickness of the electrically conductive ink deposited on the shopping bag 10 is another dimensional parameter to be selected. In a disposable version of the shopping bag 10, a very thin layer of ink without appreciable long-term durability may be suitable, since the shopping bags may be stored at a checkout and handled very little before the RFID scanning of the shopping bag contents is complete. The electrically conductive ink may even be printed in a crosshatching pattern rather than a solid line, to reduce the amount of ink required while maintaining continuous electrical conductivity along each RFID loop antenna L1, L2. This minimization of ink furthers a design goal of producing a disposable shopping bag with minimal cost and minimal environmental impact upon disposal. A stouter, multiple-use version of the shopping bag may include a thicker band of electrically conductive material in the antenna for increased antenna durability, whether the antenna comprises conductive ink or is separately formed. The increased durability of the multiple-use version also minimizes environmental impact by offsetting any increased material content with the ability to use the shopping bag multiple times in its life cycle.

Figure 2:
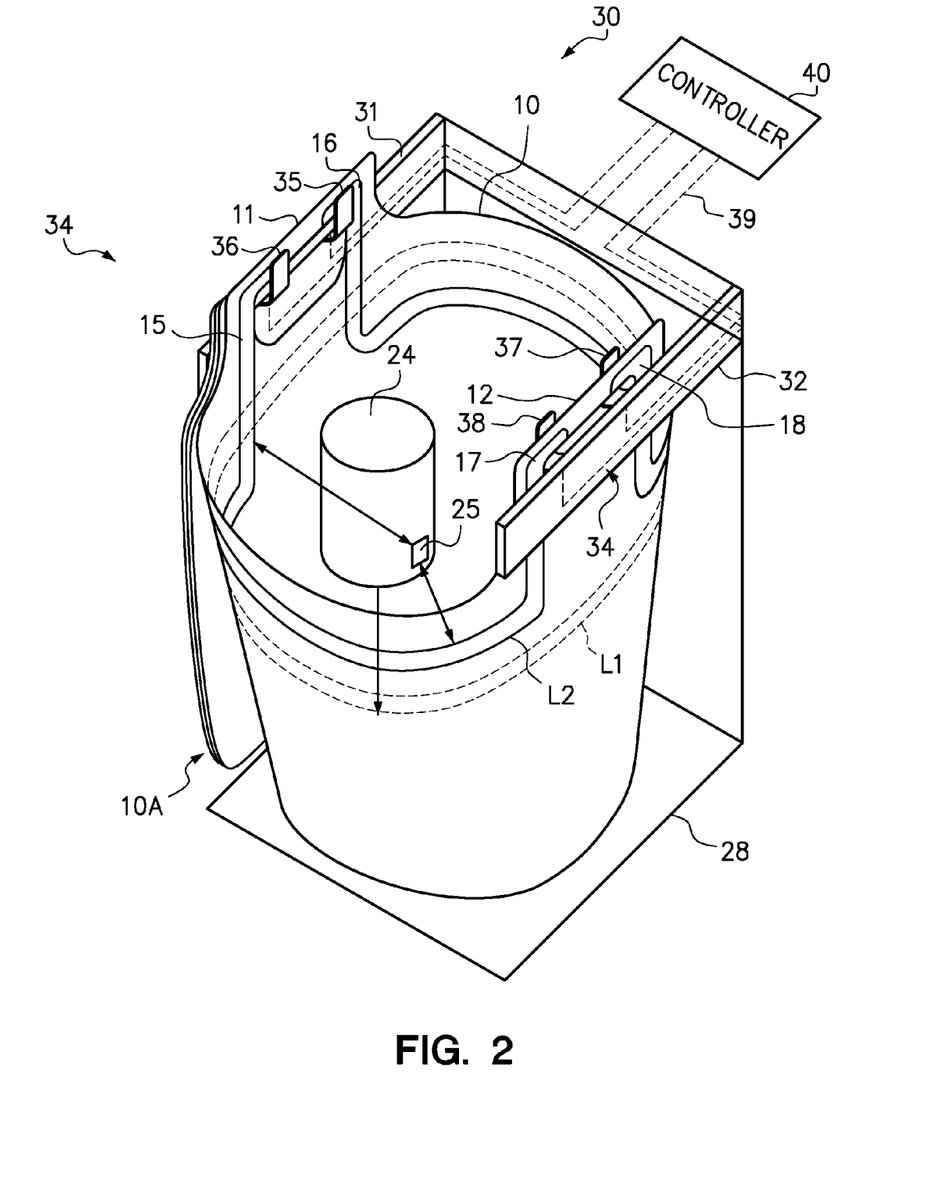
FIG. 2 is a perspective view of the shopping bag of FIG. 1, as secured to a shopping bag holder in electronic communication with an RFID system controller.

FIG. 2 is a perspective view of the shopping bag 10 of FIG. 1, as secured to a shopping bag holder 30 in electronic communication with an RFID system controller 40. Only a partial view of the antennas L1, L2 are shown here, for ease of illustration; reference may be made to FIG. 1 for details of a specific example embodiment of the RFID loop antennas L1, L2. The shopping bag holder 30 includes an opposing pair of support arms 31, 32 that are used to suspend the shopping bag 10 above a base 28. The shopping bag holder 30 includes an electronic bag interface 34 that electrically connects with the RFID loop antennas L1, L2. Generally, a bag interface for electrically connecting with an RFID loop antenna on a shopping bag may take a variety of different forms, such as a particular arrangement of electrical contacts or a particular type of electrical connector, for interfacing with corresponding electrical contacts or electrical connector on a shopping bag. By way of example, the shopping bag interface 34 in this particular embodiment of the shopping bag holder 30 includes a first pair of prongs 35, 36 on the first support arm 31 and a second pair of prongs 37, 38 on the second support arm 32. As noted above, the exposed ends 15, 16 of the first RFID loop antenna L1 and the exposed ends 17, 18 of the second RFID loop antenna L2 act as respective pairs of electrical contacts on the shopping bag 10. The first pair of prongs 35, 36 may be electrically conductive, or have electrical contacts (see FIG. 3), for engaging the exposed ends 15, 16 of the first RFID loop antenna L1, and the second pair of prongs 37, 38 may be electrically conductive or have electrical contacts that engage the exposed ends 17, 18 of the second RFID loop antenna L2. Signal lines 39 extend from the prongs 35, 36, 37, 38 to the RFID system controller 40.

A supply of shopping bags 10A may be stored in a compressed or unopened position on the bag holder 30. Both handles 11, 12 of each stored shopping bag 10A are initially suspended from the first arm 31 by the first pair of prongs 35, 36. The stored shopping bags 10 are flattened and will not need their RFID loop antennas activated, nor actually electrically connected to the RFID system controller 40. The particular shopping bag 10 to be filled may be opened by unhooking and moving the second handle 12 away from the first arm 31 toward the second arm 32, and positioning the second handle 12 over the second pair of prongs 37, 38 on the second arm 32. The opened shopping bag 10 interfaces with the shopping bag interface 34, whereby the ends 15, 16 of the first RFID loop antenna 11 are in electrical connection with the prongs 35, 36 of the first arm 31, respectively, and the ends 17, 18 of the second RFID loop antenna 12 are in electrical connection with the prongs 37, 38 of the second arm 32, respectively. Accordingly, the RFID loop antennas L1, L2 on the opened shopping bag 10 are electrically connected to an RFID system controller 40. The RFID system controller 40 is able to select one of the RFID loop antennas L1, L2 and use the selected RFID loop antenna for reading the RFID tag 25 on each item 24 being placed in the shopping bag 10. The RFID tag identifies product information about the item 24, such as product type, brand, size, weight, and price.

Figure 3:
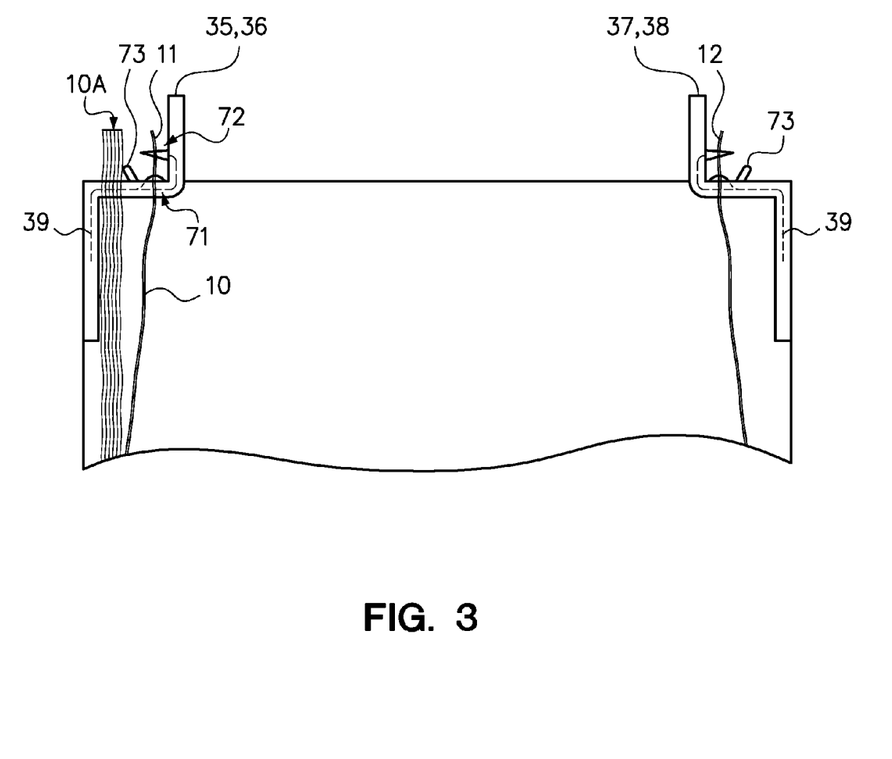
FIG. 3 is a partially-cutaway, front-facing elevation view of the shopping bag holder illustrating alternative types of electrical contacts on the prongs.

FIG. 3 is a partially-cutaway, front-facing elevation view of the shopping bag holder 30 of FIG. 2. FIG. 3 illustrates two alternative types of electrical contacts that may be used on the prongs 35-38 for interfacing with the loop antennas on the shopping bag 10. Both pad type contacts 71 and puncture type contacts 72 are shown in FIG. 3, by way of example. However, only one of the two sets of contacts 71 or 72 may be selected for use in a practical embodiment. Pad type contacts 71 rely on the weight of the shopping bag 10 and its contents to urge the exposed ends of the loop antennas (see FIG. 2) into electrical connection with the pad type contacts. Puncture type contacts 72 are used to instead puncture (i.e. pierce) the shopping bag 10. Puncturing the shopping bag 10 somewhere along the loop antenna(s) near their ends ensures reliable electrical connection with the loop antennas. Puncturing the shopping bag 10 with a puncture type contact 72 also may be done to make contact with a loop antenna that is on an opposite surface of the shopping bag from the puncture type contacts 72. The selected set of contacts 71 or 72 are electrically connected with the signal lines 39 that lead to the RFID system controller 40, as discussed above. To prevent the supply of shopping bags 10A from being inadvertently connected when stored, the handles 11, 12 of the supply of shopping bags 10A are held back from the electrical contacts 71 or 72 until a selected bag 10 is to be used. Then, the handles 11, 12 of an individual bag 10 may be moved into position to make electrical connection with the signal lines 39. The bags may be held back from the contacts 71, 72 using any sort of retention mechanism, such as a retainer tab 73. Alternatively, the bags 10A may be held back from the contacts 71, 72 by friction.

Figure 4:
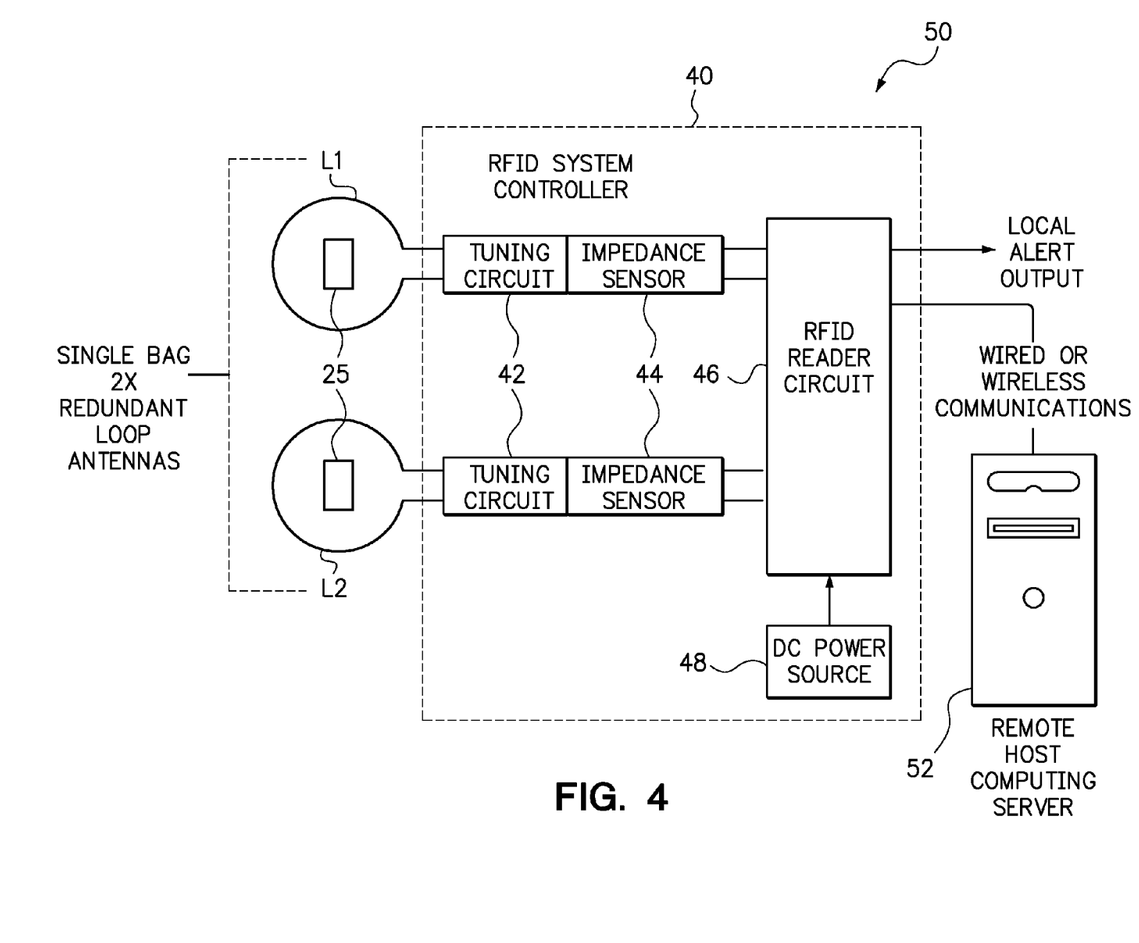
FIG. 4 is a schematic diagram of an inventory tracking system that includes the RFID system controller of FIG. 2.

FIG. 4 is a schematic diagram of an inventory tracking system 50 that includes the RFID system controller 40. The RFID system controller 40 is located remotely to the shopping bag, such as at or near a checkout station. The RFID system controller 40 is electrically coupled to both RFID loop antennas L1, L2. A tuning circuit 42 and impedance sensor 44 are coupled to each RFID loop antenna L1, L2 via the bag rack disclosed in FIG. 2. The tuning circuit 42 and impedance sensor 44 may be separate circuits for each antenna L1, L2 or circuits shared by both antennas. The tuning circuit 42 and RFID loop antenna 44 are in communication with an RFID reader 46. Control logic for the RFID system controller 40 may reside on the RFID reader 46 or may be distributed among more than one component of the RFID system controller 40. The RFID reader is configured for reading an RFID tag 25 using a selected one or more of the two antennas L1, L2. Note that the two RFID loop antennas L1, L2 shown side by side in the schematic diagram may be physically positioned one above the other as shown in FIGS. 1 and 2, with both RFID loop antennas L1, L2 simultaneously within readable range of the same RFID tag 25. The inventory tracking system 50 includes a remote host computing server (i.e. "remote host") 52. The remote host 52 includes a database of product information that can be cross-referenced with information from the scanned RFID tag 25, and may accumulate data collected from each transaction.

Control logic is included, preferably within the RFID system controller 40, for dynamically selecting one of the two antennas L1, L2 for use in scanning the RFID tags 25 using the RFID reader circuit 46. The RFID system controller 40 may select which antenna to use based, at least in part, on the impedances of the RFID loop antennas L1, L2. The target antenna impedance for each antenna is a design parameter, which may be a function of the electrically conductive antenna material, the antenna dimensions, and the particular antenna path and number of loops in each antenna. A target impedance of about 50 ohms for an opened shopping bag is within range of a useful RFID antenna impedance. The actual impedances of the RFID loop antennas L1, L2 may deviate from their expected values, such as due to manufacturing tolerances in forming the shopping bag 10. The actual impedance of the antennas measured by the impedance sensors 44 may also vary due to the flexible nature of the shopping bag 10. For example, as the shopping bag 10 is handled, and particularly as items are placed into the shopping bag 10, the shape and position of the shopping bag 10 may change, causing a change in the measured impedance values. An antenna may eventually fail due to fatigue if the shopping bag 10 is mishandled or used beyond its design life. Damage to an antenna short of fully severing the antenna may change the antenna impedance, and a complete severing of the antenna may render it unusable. Such damage may be sensed, for example, as an excessive or "infinite" impedance indicative of an open circuit. Thus, having two or more RFID loop antennas L1, L2 also provides redundancy, by allowing one of the antennas to serve as a backup antenna in the event that another antenna fails.

Because the impedances of the RFID loop antennas L1, L2 may vary, the RFID system controller 40 uses the impedance sensors 44 to dynamically measure the impedance of each RFID loop antenna 44 and to select the best antenna based on the currently measured impedance values. The RFID system controller 40 then uses the tuning circuit 42 to tune the RFID reader to match the measured impedance of the currently selected antenna L1 or L2. In one implementation, the impedance values of the RFID loop antennas L1, L2 are measured in serial fashion using the impedance sensors 44, and the RFID system controller 40 dynamically selects and switches to the best antenna L1 or L2 for usage according to the sensed impedance values. In selecting which RFID loop antenna to use, the RFID system controller 40 may compare the measured impedances to a predetermined impedance threshold to determine the "quality" or usability of each antenna L1, L2. The threshold may have an upper limit and a lower limit. A simplified and lower cost impedance sensing circuit may simply detect an "out of tolerance" antenna impedance as one which is not currently between the upper and lower thresholds, without necessarily determining an actual impedance value. The RFID system controller 40 could be programmed with different impedance thresholds for different antenna designs, and select the impedance thresholds to be used according to the currently used antenna design.

Figure 5:
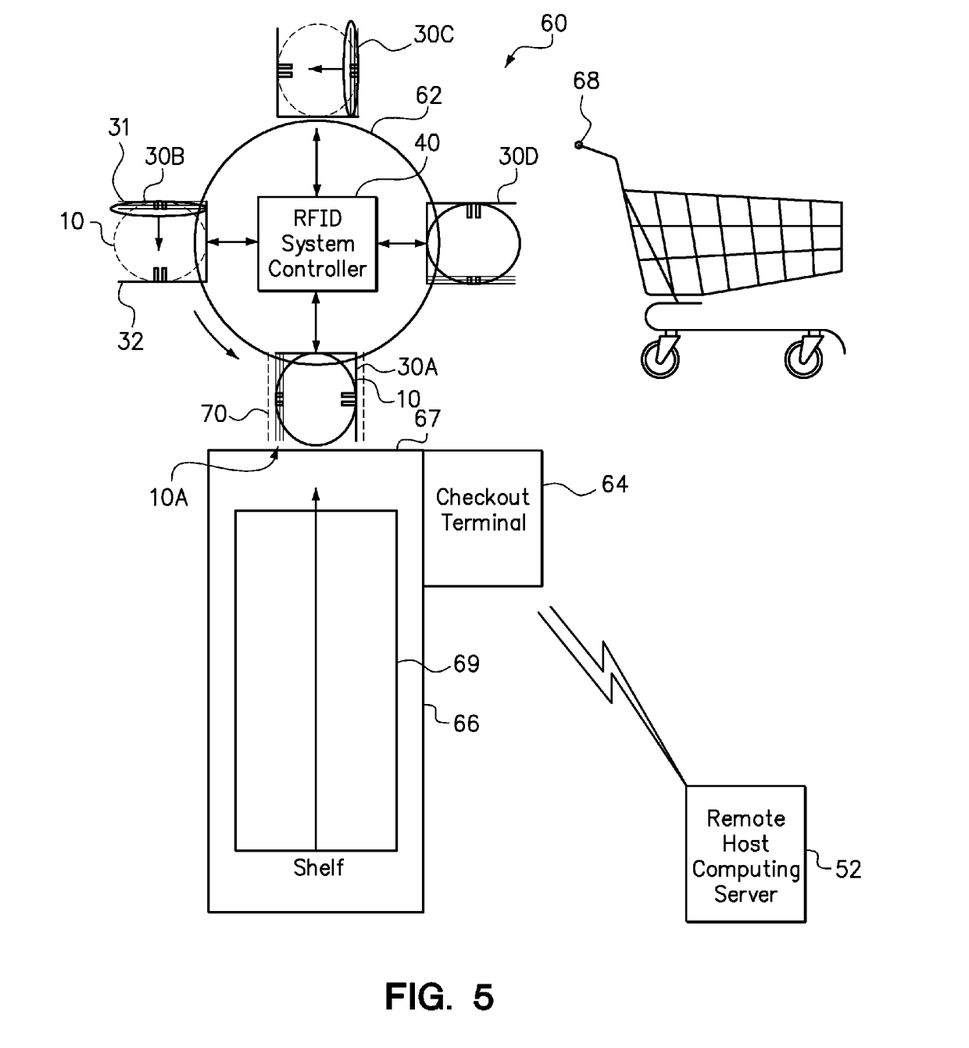
FIG. 5 is a plan view of a point of sale checkout system incorporating the inventory tracking system of FIG. 3 and a shopping bag carousel having a plurality of bag holders of the type detailed in FIG. 2.

FIG. 5 is a plan view of a point of sale (POS) checkout 60 incorporating the inventory tracking system 50 of FIG. 3 and a shopping bag carousel 62 having a plurality of bag holders 30A, 30B, 30C, 30D of the type detailed in FIG. 2. A counter 66 is provided as a place for putting loose items removed from a shopping cart 68, prior to bagging the items. A conveyor 69 is optionally provided to move the loose items toward the carousel 62. A checkout terminal 64 facilitates the purchase of items selected by a shopper. The checkout terminal 64 includes hardware such as an electronic register for computing and displaying transaction information such as a list of scanned items, a description and price of the scanned items, and a purchase total. The checkout terminal 64 may also include common POS devices such as a cash drawer, a payment card reader, a receipt printer, and a coupon printer. The RFID system controller 40 (disclosed in FIG. 4) is positioned, by way of example, within the carousel 62. Some components of the RFID system controller 40 may be located elsewhere, such as within the checkout terminal 64. The remote host 52 may be located anywhere with a network connection, and is in electronic communication with the checkout terminal 64. The RFID system controller 40 may be in direct or indirect electronic communication with either or both of the checkout terminal 64 and the remote host 52. The checkout terminal 64 and the carousel 62 are both conveniently located for operation by a cashier, as in the case of a traditional cashier-supervised purchasing transaction, or by the customer, as in the case of a self-serve style checkout.

Four shopping bag holders are provided on the carousel 62 in this example, individually identified at 30A, 30B, 30C, and 30D. A different number of shopping bag holders may alternatively be included depending, for example, on the size of the shopping bags 10 and the size of the carousel 62. A refillable supply of shopping bags may be provided at each bag holder 30, hanging in a flat or compressed state from one of the two arms 31, 32. One of the bags 10 from the stored supply of shopping bags may be opened and supported from both arms 31, 32, as described above with regard to FIG. 2. The carousel 62 can be rotated to position any one of the shopping bag holders at a "fill station" 70 at one end 67 of the counter 66.

FIG. 5 shows a first shopping bag holder 30A currently positioned at the fill station 70. After placing one or more items in the shopping bag 10 in the first bag holder 30A, the carousel 40 may be rotated (counterclockwise in this example) to position a next bag holder 30B at the fill station 70. The shopping bag 10 on the next bag holder 30B may be opened at the fill station 70 or prior to being positioned at the fill station 70. With the second bag holder 30B positioned at the fill station 70, one or more items may be placed in the opened shopping bag 10 of the second bag holder 30B. Rotating the carousel 62 to advance the next second bag holder 30B at the fill station 70 brings the previously filled shopping bag 30A to an open area, where the filled shopping bag may be conveniently removed from the bag holder 30A and optionally placed in the shopping cart 68 for transporting out of the store by the customer. The process may continue, each time advancing one of the bag holders 30A-D on the carousel 62 having an empty bag to the fill station 70, and advancing a filled bag out of the fill station 70 to be removed from the carousel 62.

As the items are placed in the opened shopping bag 10 currently at the fill station 70, an RFID loop antenna on the shopping bag 10 is used by the RFID system controller 40 to scan the RFID tags on the items. Scanning the RFID tags individually as they pass through the antenna loop(s) facilitates accurate scanning. However, each bag holds a sufficiently small quantity of items that the RFID tags may alternatively be scanned all at once after already having been placed in the shopping bag 10. The identities of the scanned items are communicated to the remote host 52, perhaps directly or via the checkout terminal 64. The identities of the scanned items may be cross referenced with an item database at the remote host 52 to obtain product information about the scanned items. The product information, such as an item description and price, is then communicated back to the checkout terminal 64, where the product information is selectively displayed and a sub-total of the cost may be computed.

An "active bag" may refer to a shopping bag 10 on the carousel 62 that has been opened for use, with bag handles attached to the conductive contacts on the bag holder arms. When the RFID Reader circuit senses an antenna connection to the bag holder via sensing an impedance in a predefined range, the shopping bag becomes active. An optional security feature entails detecting when a shopping bag is disconnected, and comparing the weight of the bag against an expected weight. The shopping bag 10 may be weighed, and the weight of the disconnected shopping bag may be compared against the expected weight based on the items inside the shopping bag. The expected weight may be computed based on item information from the remote host 52. An indication of the difference between the weight and the expected weight may be output. For example, if the weight is within an expected weight range, a confirmation may be displayed. If the weight does not agree with the expected weight range, and particularly if the weight is substantially greater than the expected weight, then an alarm may be sounded or displayed that would alert store personnel to inspect the shopping bag 10 for any unscanned items that may not have been accounted for at purchase.

Figure 6:
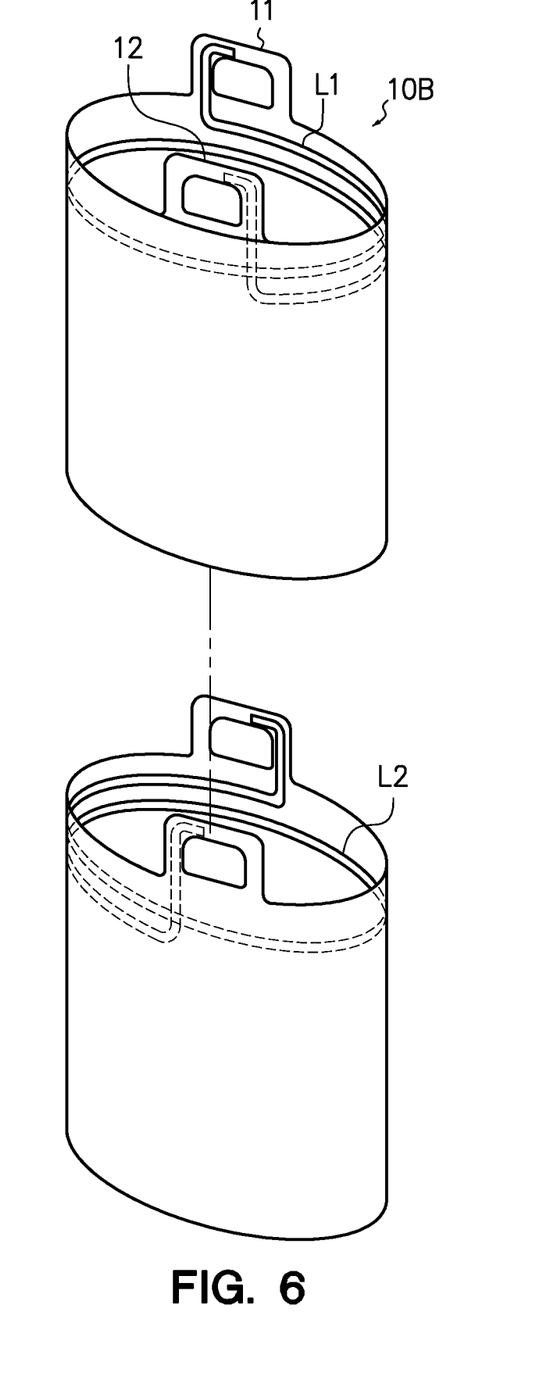
FIG. 6 is a layered, perspective view of an alternative disposable shopping bag, wherein each RFID loop antenna terminates at one end on one handle and at the other end on the other handle.

FIG. 6 is a layered, perspective view of an alternative disposable shopping bag 10B, wherein each RFID loop antenna L1, L2 terminates at one end on one handle 11 and at the other end on the other handle 12. For clarity, the loop antennas L1, L2 are shown on separate layers, with the layers positioned one above the other, in an assembly-view fashion. The shopping bag 10B may actually be manufactured as two separate layers (i.e. bag plies), with one antenna per bag ply, as shown. The two bag plies may then be joined, such as by bonding. Alternatively, the two antennas L1, L2 may be formed on a unitary bag, in which case the illustrated layers are simply provided as a drawing aid to help the reader visualize the separate paths that each antenna L1, L2 follows. In this embodiment, each loop antenna L1, L2 follows a path around the perimeter of the shopping bag 10B, terminating at one end on one handle 11 and at the other end on the other handle 12. Each loop antenna L1, L2 follows a path of more than one full loop (i.e. more than 360 degrees) around the perimeter of the shopping bag 10B, to ensure continuity of the electromagnetic antenna loop field. An electrically insulating material may be applied in any locations where one antenna intersect another antenna, or where one of the antennas intersects itself. If the loop antennas L1, L2 are formed on separate plies and the plies subsequently joined, the bag material, itself, may provide sufficient electrical insulation between the two antennas L1, L2.

For each RFID loop antenna L1, L2, there may be one active electrical prong on each support arm of the bag holder (a variation of the bag holder 30 shown in FIG. 2). Thus, completing a RFID loop antenna circuit in this embodiment requires opening the shopping bag 10B to position one handle 11 on one arm of the shopping bag holder and the other handle on the other arm 12 of the shopping bag holder. This requirement of placing one handle 11 on one arm and the other handle 12 on the other arm may help the RFID controller in detecting whether the shopping bag 10B is properly positioned on the bag holder 30 of FIG. 2. This may also help avoid inadvertently energizing the RFID loop antennas L1, L2 before the shopping bag 10B is opened.

Figure 7:
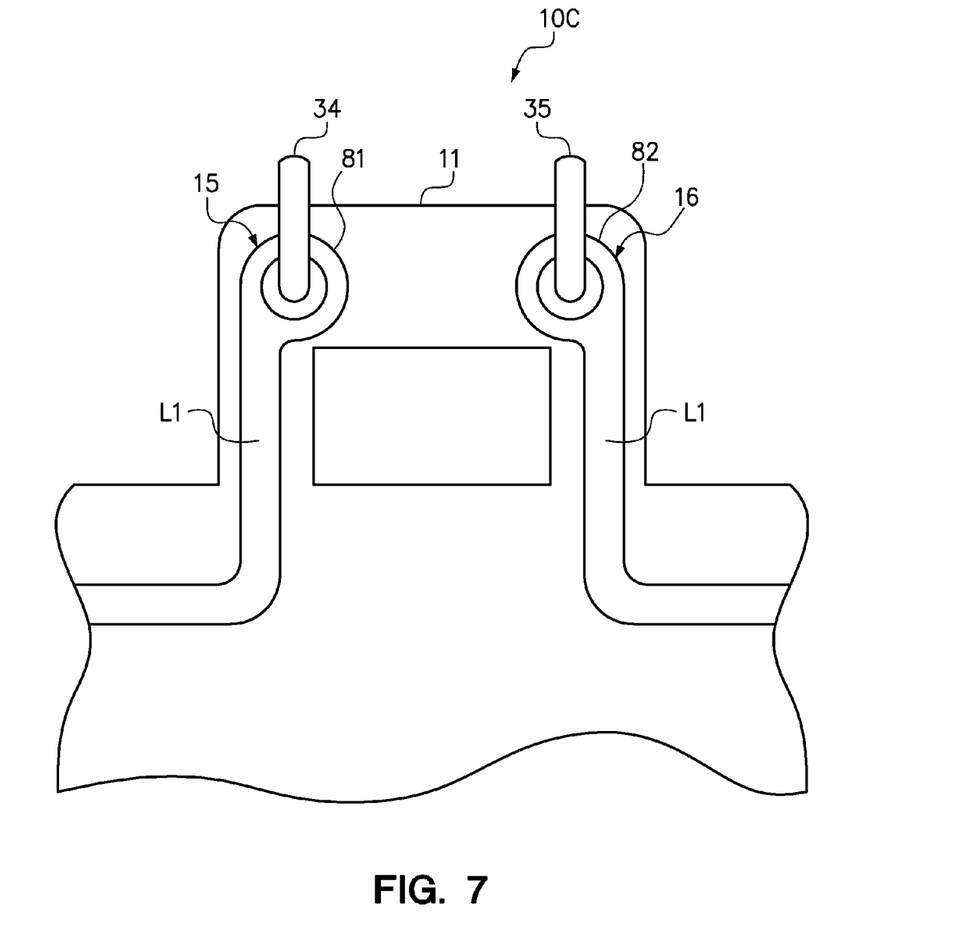
FIG. 7 is a side view of another variation of the shopping bag incorporating donut-type contacts at the ends of the RFID loop antenna.

FIG. 7 is a side view of another variation of the shopping bag 10C incorporating donut-type contacts 81, 82 at the ends 15, 16 of the RFID loop antenna L1. The donut-type contacts 81, 82 are also formed of electrically conductive ink. The prongs 34, 35 pass through holes in the donut-type contacts 81, 82, which may have close tolerances to help ensure reliable electrical connection between pad-type contacts on the prongs 34, 35 and the donut-type contacts 81, 82 on the shopping bag 10C. The weight of the suspended shopping bag 10C may also provide a downward force against the prongs 34, 35 to provide reliable electrical connection.

Figure 8:
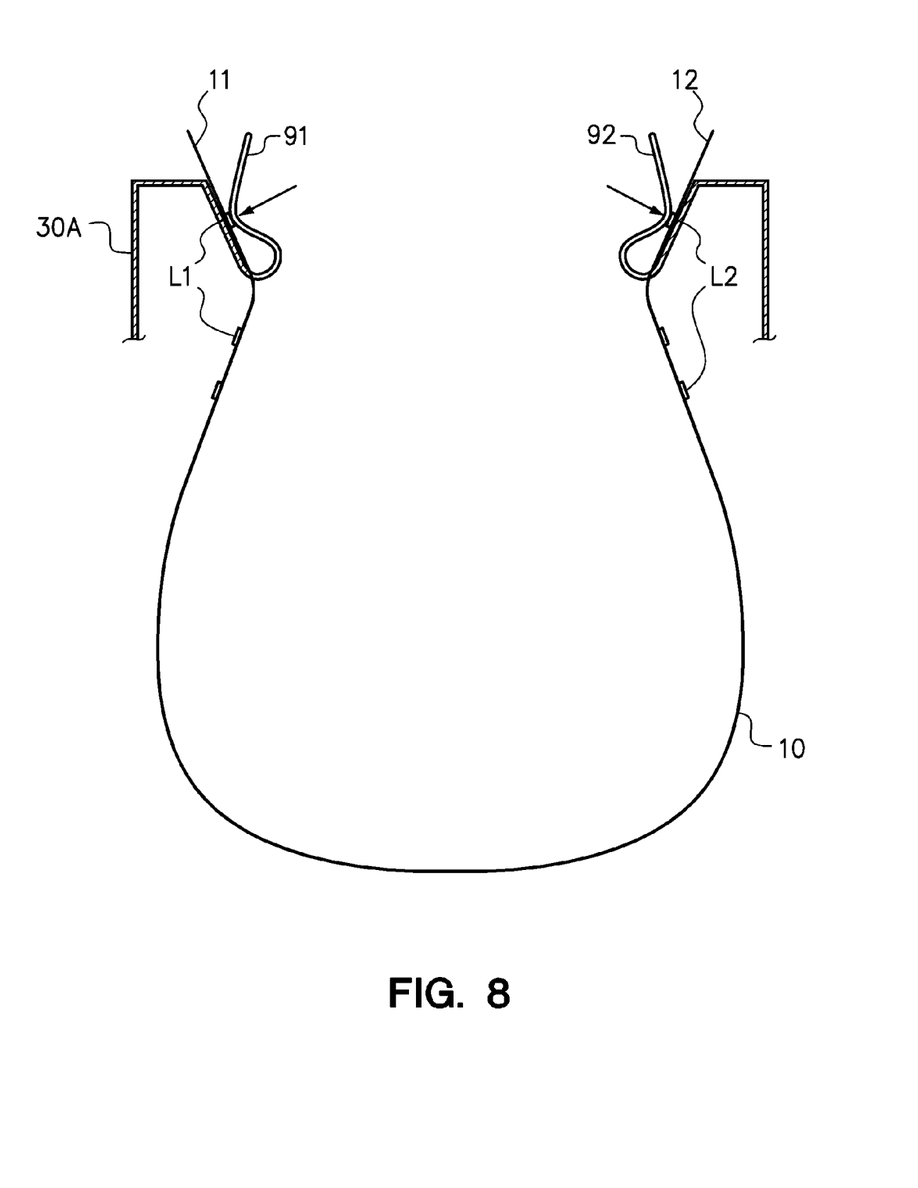
FIG. 8 is a side view of an alternative bag holder incorporating spring clips for securing the shopping bag to the bag holder.

FIG. 8 is a side view of an alternative bag holder 30A incorporating spring clips 91, 92 for securing the shopping bag 10 to the bag holder 30A. Each handle 11, 12 of the bag is "hooked" over the respective spring clip 91, 92. The spring clips 91, 92 engage a portion of the RFID loop antennas L1, L2 (schematically shown) to provide positive electrical engagement with the RFID loop antennas, as well as to provide a secure mechanical attachment of the bag 10 to the bag holder 30. Electrical communication pathways (not shown) leading to the RFID reader are provided at the points of engagement between the spring clips 91, 92 and the RFID loop antennas L1, L2.

In the above-described embodiments, the bag holders were located at POS checkout, such as on a carousel. Locating the bag holders at a POS checkout facilitates the checkout process by allowing the process to be monitored from a central location, where store personnel may be available to supervise and assist with the process. Locating the bag holders at the POS checkout also allows much of the hardware, such as the RFID system controller, to be hardwired in a fixed location. However, in an alternative embodiment, the described bag holder could be moved with the customer to allow items to be scanned while shopping. For example, in a "bag-as-you-go" embodiment, the RFID system controller and one or more bag holders may be mounted in a shopping cart, with portable power supplies and optional wireless store network connectivity.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the invention.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but it is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. An inventory tracking system, comprising:
    a shopping bag having at least one radio frequency identification (RFID) loop antenna along a perimeter of the shopping bag;
    a bag holder for securing the shopping bag with a shopping bag interface in electrical connection with the at least one RFID loop antenna; and
    a controller including an RFID reader electrically coupled with the shopping bag interface and configured to read RFID tags on items in the shopping bag using the at least one RFID loop antenna on the shopping bag.

2. The inventory tracking system of claim 1, further comprising:
    a plurality of RFID loop antennas oriented along the perimeter of the shopping bag, each RFID loop antenna terminating at a different set of electrical contacts;
    wherein the shopping bag interface is in electrical connection with each set of electrical contacts along different electrical communication paths to the RFID reader; and
    wherein the RFID reader is configured to read the RFID tags using any of the at least one RFID loop antennas.

3. The inventory tracking system of claim 2, further comprising:
    an impedance sensor electrically connected with the RFID reader, the impedance sensor configured for sensing an impedance of each RFID loop antenna; and
    wherein the RFID reader is configured for selecting one of the RFID loop antennas according to the sensed impedances of the RFID loop antennas and using the selected RFID loop antenna for reading the RFID tags.

4. The inventory tracking system of claim 3, wherein the RFID reader is configured for dynamically selecting one of the RFID loop antennas in response to a change in the sensed impedances of the RFID loop antennas.

5. The inventory tracking system of claim 1, further comprising:
    each of the at least one RFID loop antenna defining a pair of electrical contacts on the shopping bag; and
    the shopping bag interface including a pair of prongs having one or more electrical contacts positioned for connection with the pair of contacts on the shopping bag when the shopping back is secured on the bag holder, such that the RFID reader is electrically coupled with the at least one RFID loop antenna.

6. The inventory tracking system of claim 5, further comprising:
    one or more handle on the shopping bag having an opening for receiving the prongs on the bag holder, wherein the pair of electrical contacts on the shopping bag are on the one or more handle.

7. The inventory tracking system of claim 6, wherein the pair of electrical contacts for one RFID loop antenna are on the same handle.

8. The inventory tracking system of claim 6, wherein the pair of electrical contacts for the RFID loop antenna include a first electrical contact on a first handle and a second electrical contact on a second handle.

9. The inventory tracking system of claim 6, wherein the pair of electrical contacts for the RFID loop antenna comprise donut-type contacts for surrounding the prongs.

10. The inventory tracking system of claim 1, wherein the at least one RFID loop antenna consists of electrically conductive ink printed on the shopping bag.

11. The inventory tracking system of claim 1, wherein the at least one RFID loop antenna comprises:
   at least one RFID loop antenna printed on an interior surface of the shopping bag; and
   at least one RFID loop antenna printed on an exterior surface of the shopping bag.

12. The inventory tracking system of claim 1, further comprising:
   puncture type electrical contacts on the bag holder electrically coupled with the RFID reader, the puncture type electrical contacts configured to puncture a surface of the shopping bag to engage the at least one RFID loop antenna.

13. The inventory tracking system of claim 12, wherein the puncture type electrical contacts pierce the shopping bag from a surface opposite the surface on which the RFID loop antenna is printed.

14. The inventory tracking system of claim 13, wherein the controller is configured to detect a removal of one of the shopping bags from the carousel after having detected one or more RFID tags on items placed in the removed shopping bag.

15. The inventory tracking system of claim 14, wherein the controller is configured to measure the weight of each shopping bag containing items with RFID tags and compare the weight to an expected weight based on electronically stored product information associated with the RFID tags, and to output an indication of a difference between the weight and the expected weight.

16. The inventory tracking system of claim 1, further comprising:
   a carousel, with the bag holder and one or more additional bag holders supported on the carousel for simultaneously securing the shopping bag and one or more other shopping bags each having at least one RFID loop antenna, wherein each shopping bag may be electrically coupled to the RFID reader.

17. The inventory tracking system of claim 16, wherein the controller is configured to track one or more of the shopping bags being opened on the carousel.

18. The inventory tracking system of claim 1, wherein the loop antenna comprises multiple loops around the perimeter of the shopping bag.

19. The inventory tracking system of claim 1, wherein the loop antenna extends along at least 360 degrees of the perimeter of the shopping bag.

20. The inventory tracking system of claim 1, wherein the shopping bag comprises a plurality of plies, with a separate RFID loop antenna formed on each ply.

* * * * *